United States Patent
Rochefort et al.

(10) Patent No.: US 9,376,805 B2
(45) Date of Patent: Jun. 28, 2016

(54) VACUUM INSULATION PANEL

(75) Inventors: Malcolm Rochefort, Ludlow (GB);
Adrian Pargeter, West Midlands (GB)

(73) Assignee: Kingspan Holdings (IRL) Limited, Kingscourt, County Cavan (IE)

( * ) Notice: Subject to any disclaimer, the term of this patent is extended or adjusted under 35 U.S.C. 154(b) by 94 days.

(21) Appl. No.: 14/234,181

(22) PCT Filed: Jul. 23, 2012

(86) PCT No.: PCT/IE2012/000039
§ 371 (c)(1),
(2), (4) Date: Feb. 19, 2014

(87) PCT Pub. No.: WO2013/014661
PCT Pub. Date: Jan. 31, 2013

(65) Prior Publication Data
US 2014/0162014 A1    Jun. 12, 2014

(30) Foreign Application Priority Data
Jul. 22, 2011    (IE) ..................................... 2011/0329

(51) Int. Cl.
*F16L 59/065*    (2006.01)
*E04B 1/80*    (2006.01)
*E04C 2/34*    (2006.01)

(52) U.S. Cl.
CPC .......... *E04B 1/803* (2013.01); *E04C 2002/3461* (2013.01); *F25D 2201/14* (2013.01); *Y02B 80/12* (2013.01); *Y10T 29/49826* (2015.01); *Y10T 428/231* (2015.01)

(58) Field of Classification Search
CPC ............................... E04B 1/803; F16L 59/065
USPC .......................................................... 428/69
See application file for complete search history.

(56) References Cited

U.S. PATENT DOCUMENTS

| 4,718,958 A | 1/1988 | Kugelmann, Sr. |
| 5,512,345 A * | 4/1996 | Tsutsumi .............. F25D 23/063 220/592.27 |
| 2006/0024469 A1* | 2/2006 | Tenra ...................... E04B 1/803 428/69 |

FOREIGN PATENT DOCUMENTS

| FR | 2755159 A1 | 4/1998 |
| GB | 2476382 A | 6/2011 |
| JP | 2009-041648 A | 2/2009 |

OTHER PUBLICATIONS

Translation of JP 2009-041648, retrieved Mar. 28, 2014.*

*Primary Examiner* — Alexander Thomas
(74) *Attorney, Agent, or Firm* — Harness, Dickey & Pierce, P.L.C.

(57) ABSTRACT

A vacuum insulating panel comprise a first sheet of a flexible material, a second sheet of a flexible material and a bridging element of a flexible material extending in a generally rectilinear waveform between the first and the second sheets. The bridging element and the sheets define therebetween a plurality of separate generally rectilinear evacuated compartments containing a self-supporting insulating element. The bridging element comprise first flat regions extending along the inside face of the first sheet, second flat regions extending along the inside face of the second sheet, and connecting regions extending between the first and second flat regions, There are seals between the flat regions of the bridging element and the inside face of the sheets. If one compartment is punctured only that compartment is affected. The seals prevent loss of vacuum in adjacent compartments.

23 Claims, 19 Drawing Sheets

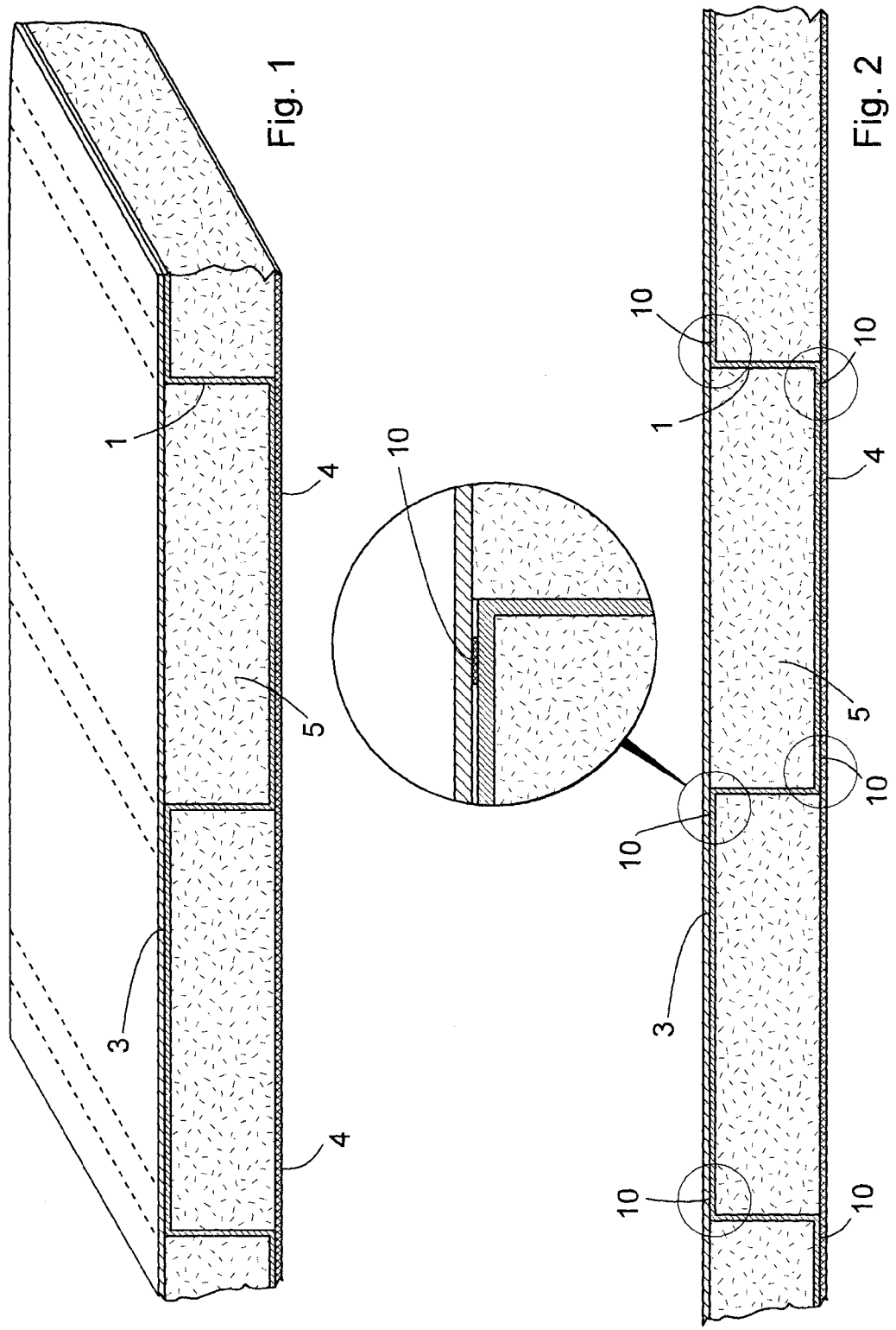

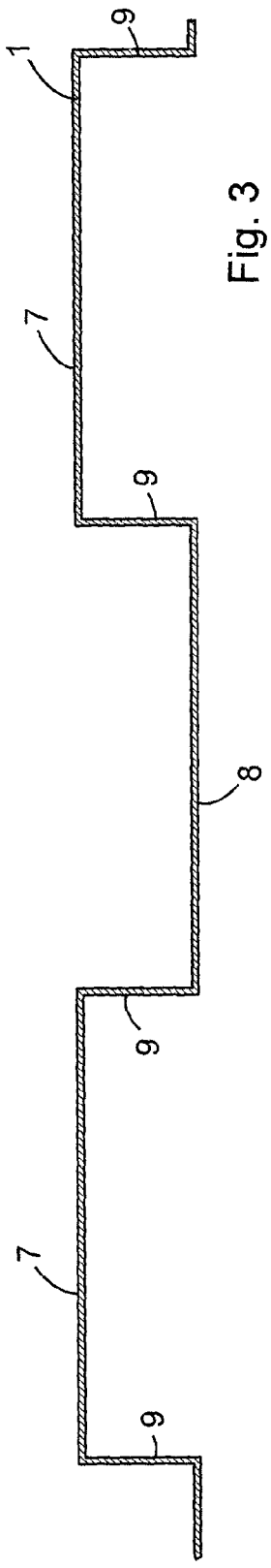
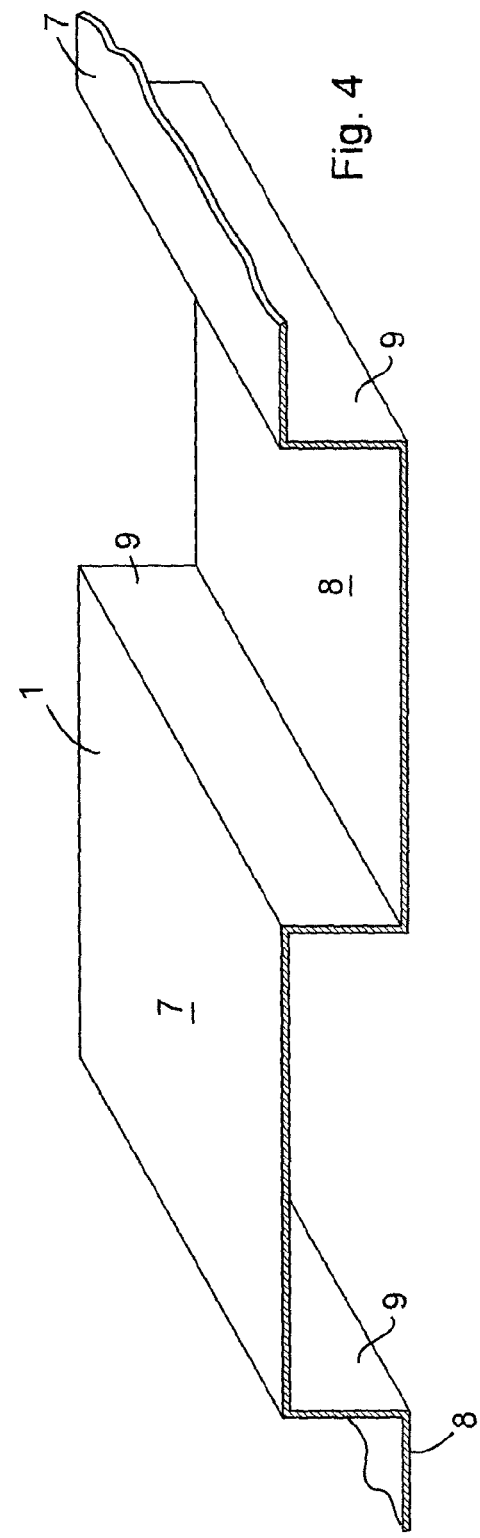

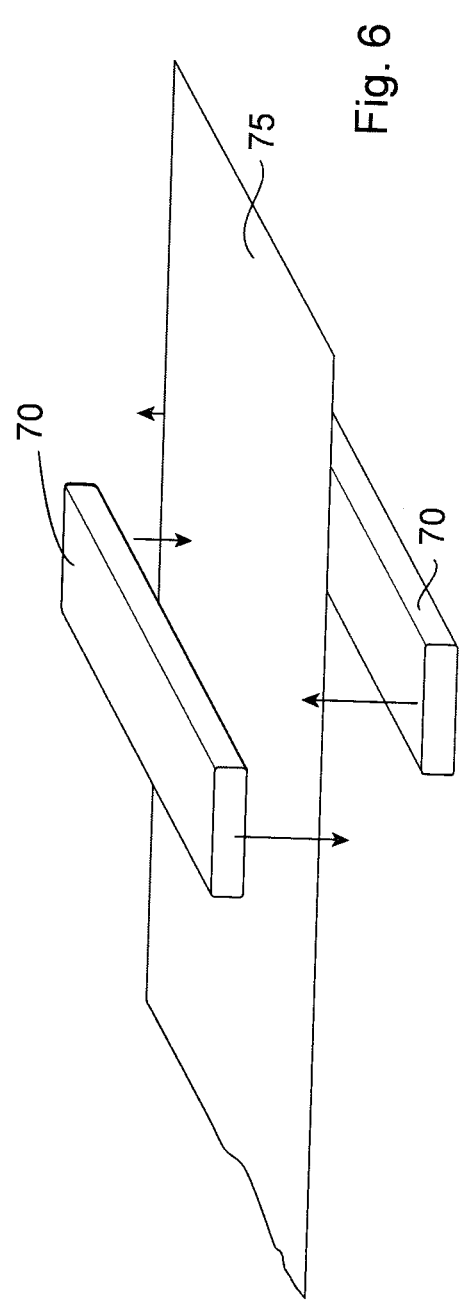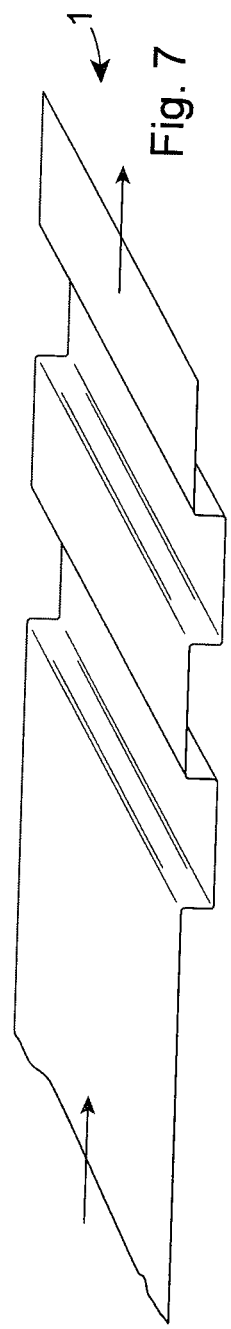

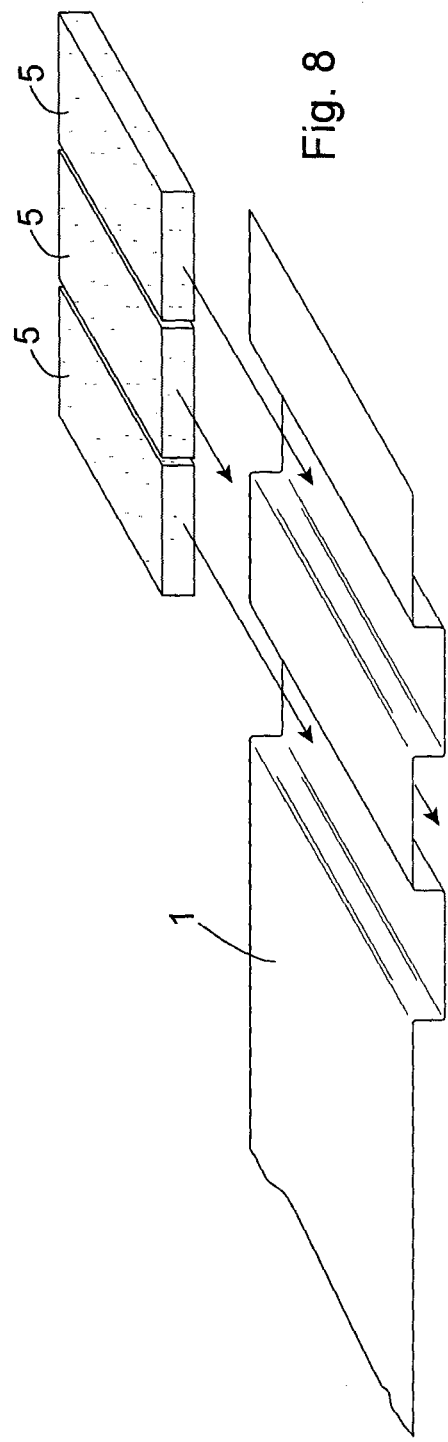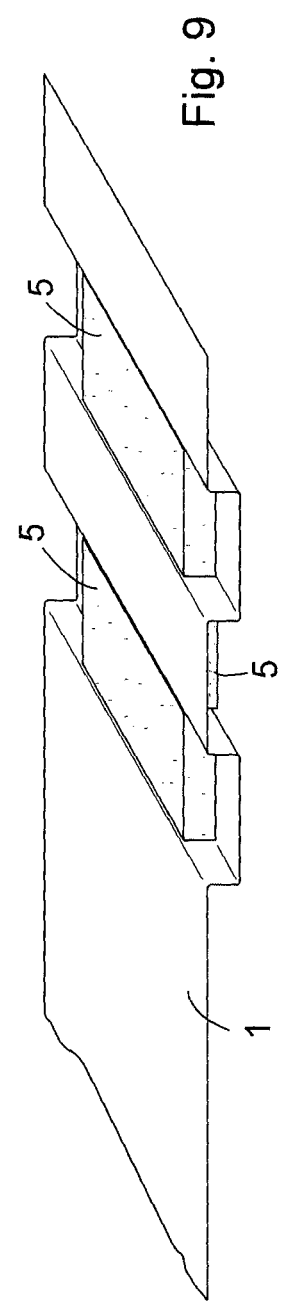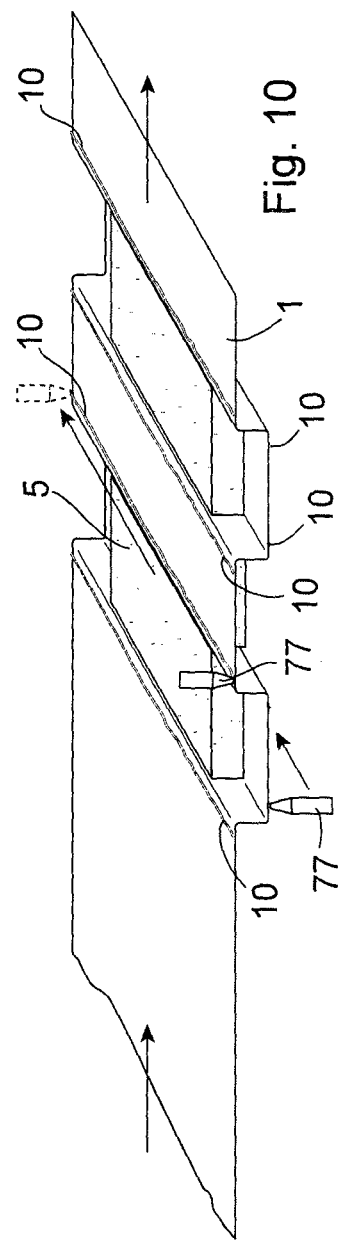

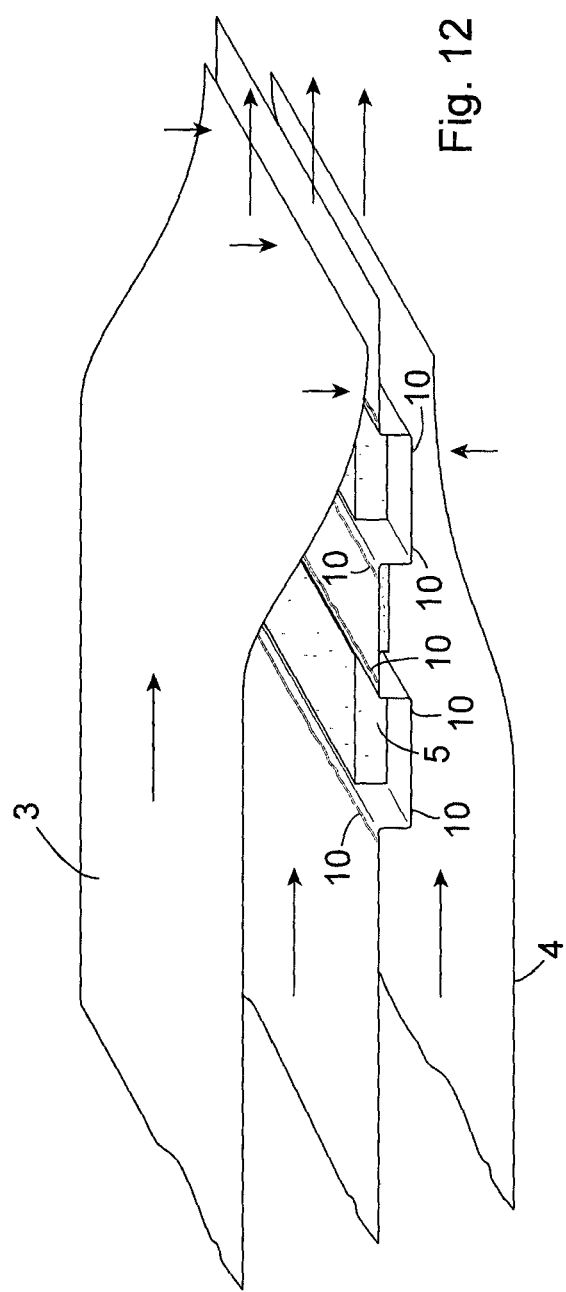
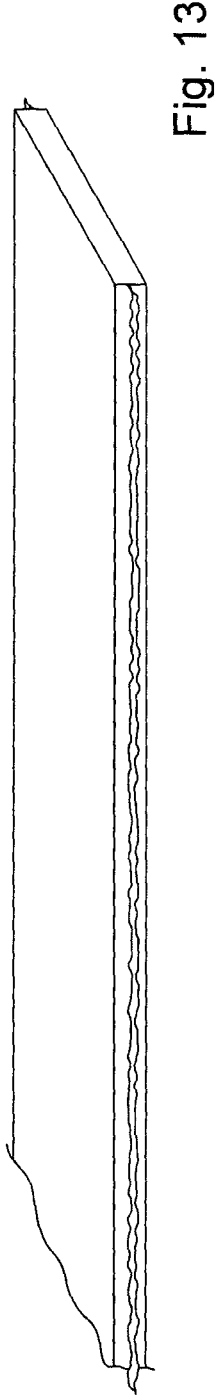
Fig. 12
Fig. 13

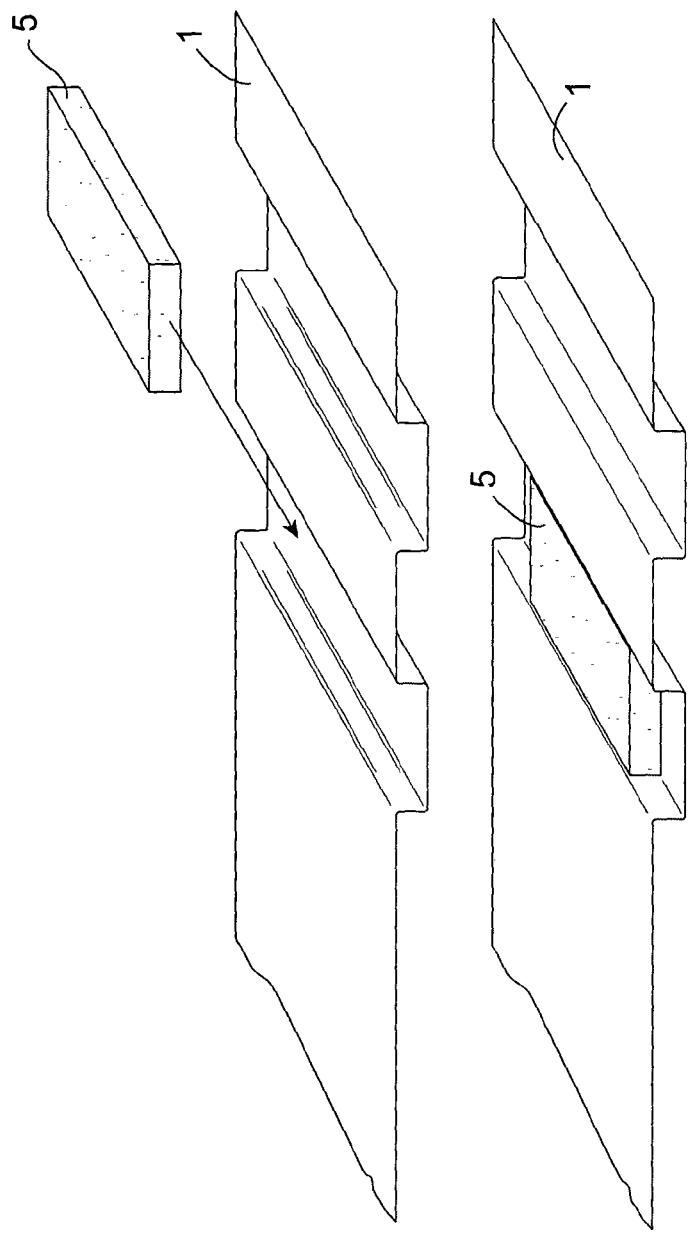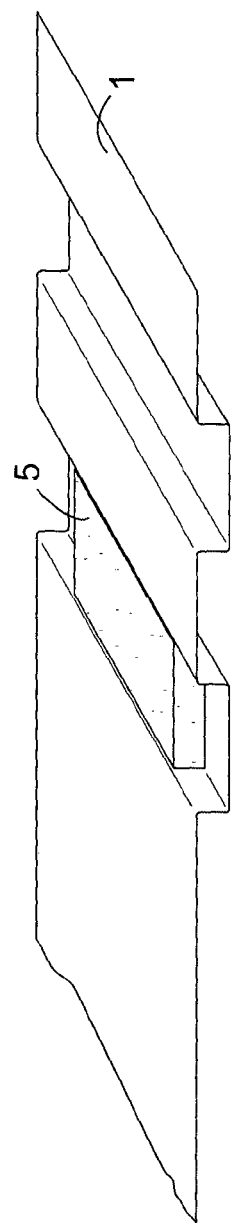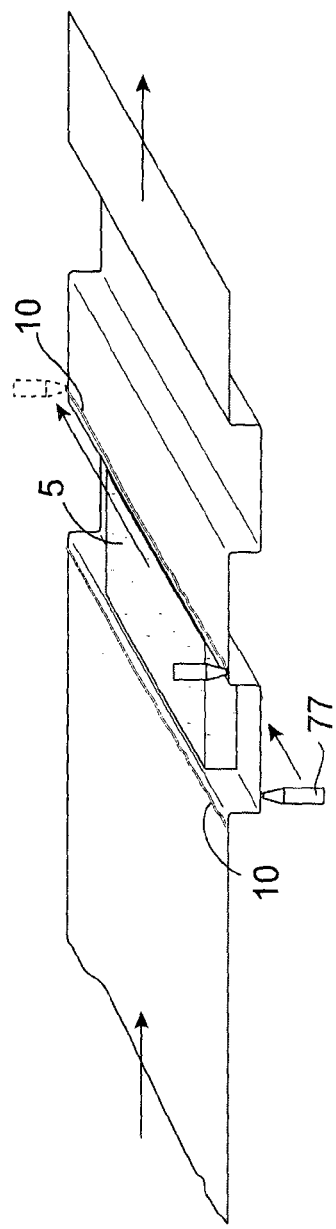

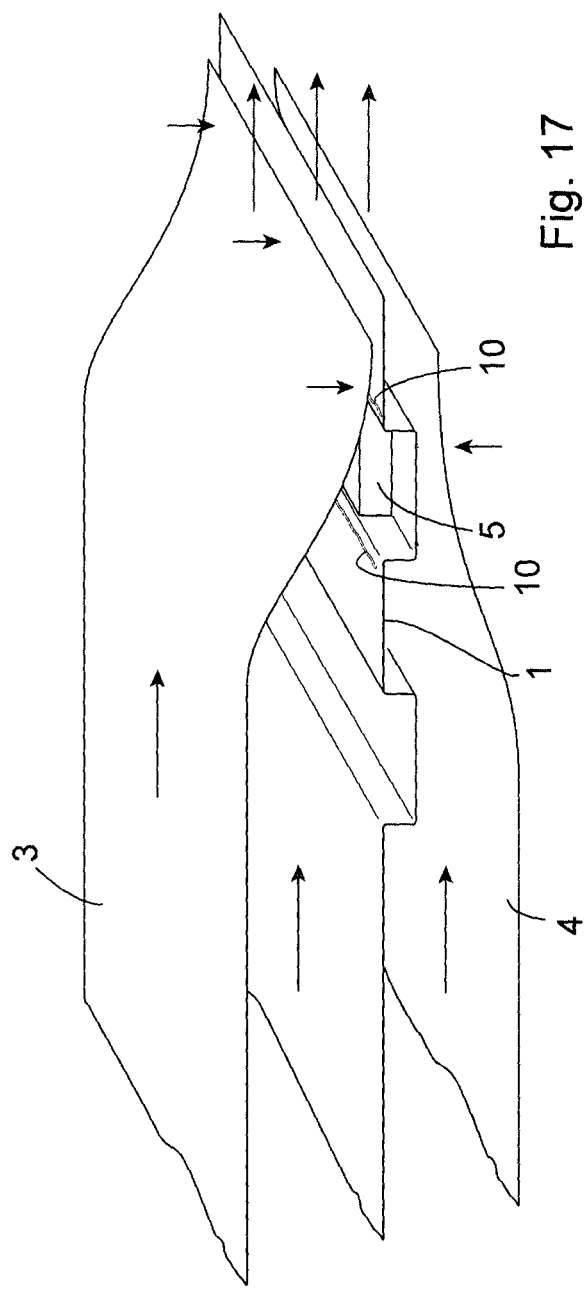

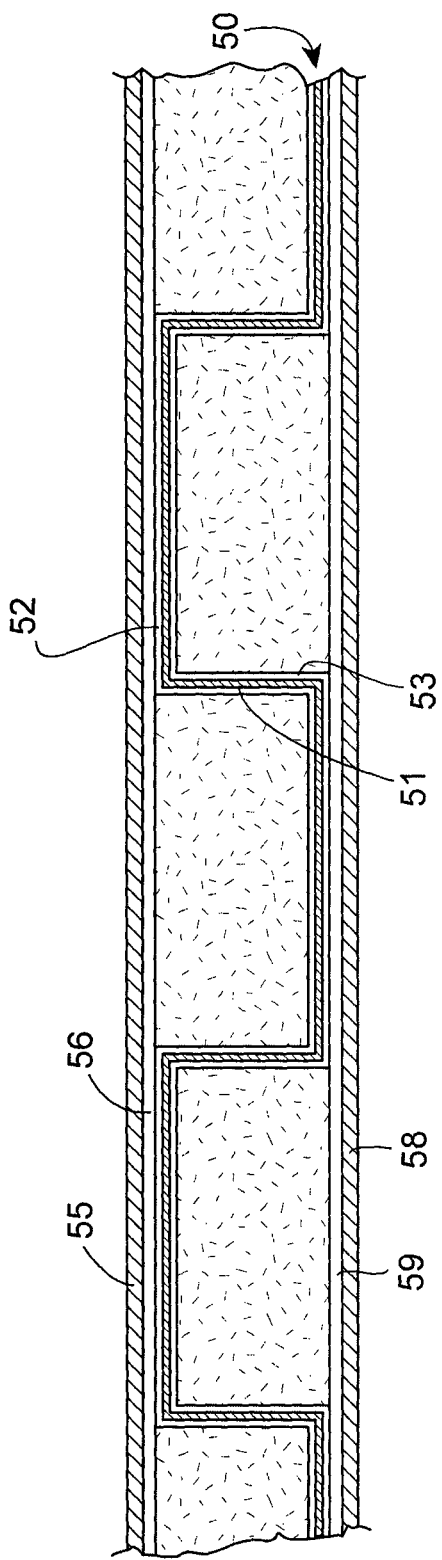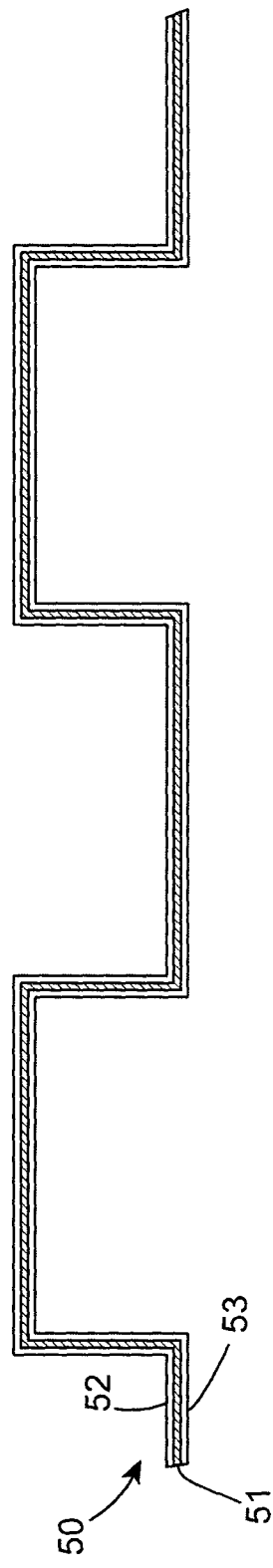
Fig. 18
Fig. 19

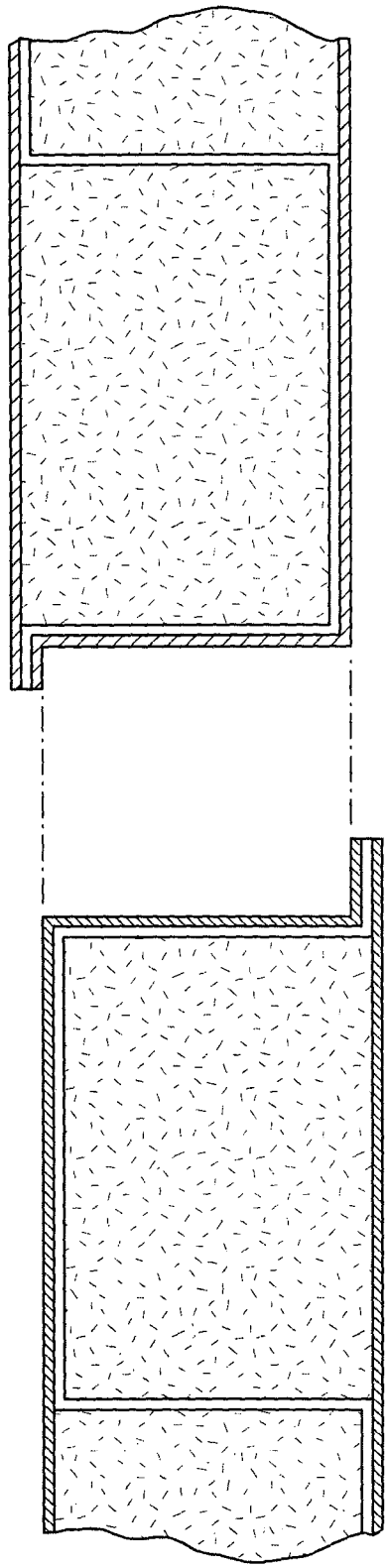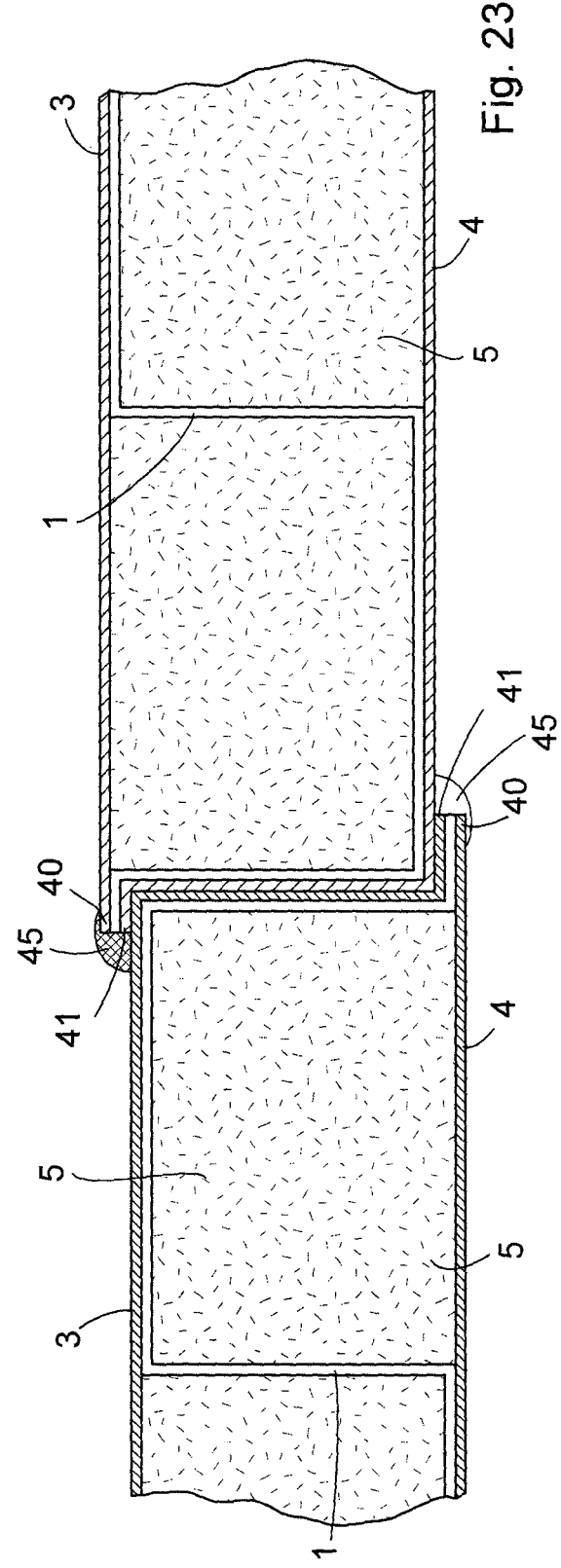

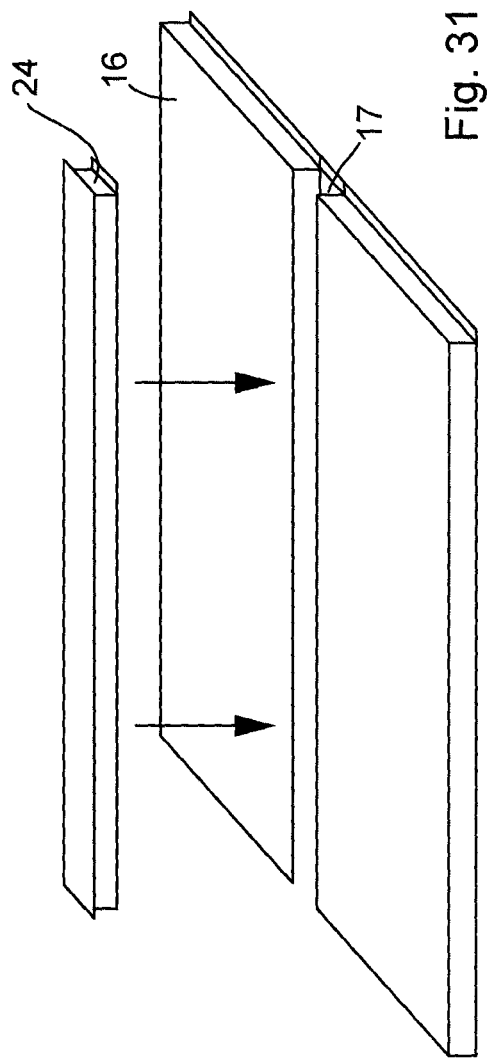
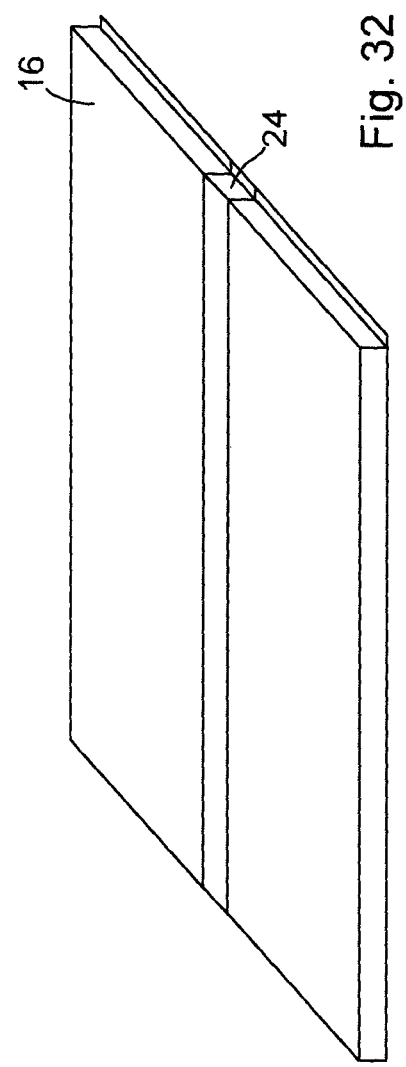

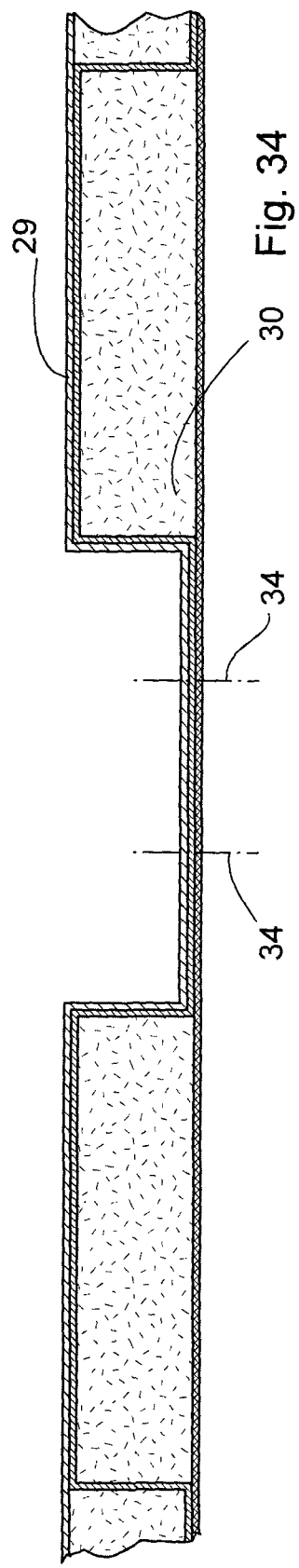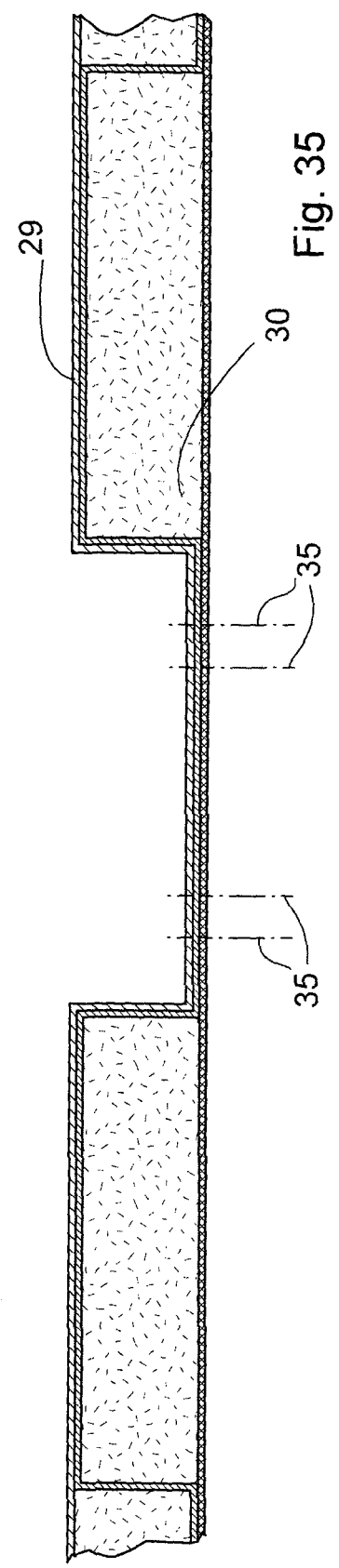

VACUUM INSULATION PANEL

INTRODUCTION

This is a national stage of PCT/IE12/00039 filed Jul. 23, 2012 and published in English, which has a priority of Irish no. 2011/0329 filed Jul. 22, 2011, hereby incorporated by reference.

This invention relates to vacuum insulation panels (VIP). Current VIP technology used in refrigeration units and the like generally comprises a single panel of insulation material formed typically of fumed silica, mineral fibre or other microporous material core, which may or may not contain infra red opacifiers, the core wrapped in a flexible, gas-tight envelope and a vacuum applied before sealing. The vacuum is essential to the panel's thermal insulating performance. Thermal conductivity properties of VIPs are typically of the order of 0.005 W/mK. If the vacuum is lost the panel loses a large proportion of its effectiveness as a thermal insulator, with the thermal conductivity reverting to that of the core material, which is typically above 0.020 W/m.K The use of VIP technology in construction is not widespread but could enable improved insulation properties and allow a significant reduction in thickness of insulation materials required to meet ever increasing requirements for thermal efficiency of buildings. However, in considering the use of VIP for insulation in building's floor, wall or roof there is a need to create robustness against various threats to piercing due to one or more of handing damage; cutting to size on site; fixing of panels to building substrate; and damage caused by drilling of holes for wiring, shelf fixing and the like.

It has been suggested to provide VIPs with compartments and sealed regions around the compartments. However, such sealed regions between compartments have poor thermal insulation properties and lead to a reduction in the overall thermal performance of the panel.

STATEMENTS OF INVENTION

According to the invention there is provided a vacuum insulating panel comprising a first sheet of a flexible material, a second sheet of a flexible material, a bridging element of a flexible material extending in a generally rectilinear waveform between the first and the second sheet, the bridging element and the sheets defining therebetween a plurality of separate generally rectilinear evacuated compartments containing a self-supporting insulating element, the bridging element comprising first flat regions extending along the inside face of the first sheet, second flat regions extending along the inside face of the second sheet, and connecting regions extending between the first and second flat regions, and for each compartment, a plurality of seals between the flat regions of the bridging element and the inside face of the sheet.

In one embodiment for each compartment there are at least two spaced-apart seals between the bridging element and the sheet.

In one embodiment a seal is located adjacent to each corner of the bridging element in contact with the sheet.

According to the invention there is provided a vacuum insulating panel comprising a first sheet of a flexible material, a second sheet of a flexible material, and a bridging element of a flexible material extending between the first and the second sheets, the bridging element comprising regions for attaching the bridging element to the sheets, the bridging element and the sheets defining therebetween a plurality of separate generally rectangular evacuated compartments containing a self-supporting insulating medium.

In one embodiment the attachment regions are substantially flat. The attachment regions may be bonded to the sheets. The attachment regions may be adhesively bonded to the sheets.

In one embodiment the bridging element is of generally rectilinear wave form extending between the first sheet and the second sheet.

The panel may comprise at least two panel parts which are separated by a fixing gap. The gap may extend longitudinally along the length of the panel. The panel may include a filler for filling the gap. There may be at least two spaced apart fixing gaps.

The bridging element may substantially reduce heat conduction across the panel. In one embodiment the bridging element is pre-formed to a shape. The bridging element may be of a polyethylene film.

In one case the bridging element comprises a single layer.

In another case the bridging element comprises a plurality of layers. The bridging element may comprise a barrier layer, a first bonding layer on one face of the barrier layer for bonding to the first sheet, and a second bonding layer on an opposite face of the barrier layer for bonding to the second sheet. The barrier layer of the bridging element may comprise a metal or metallised material. The first sheet may comprise an outer barrier layer and an inner bonding layer for bonding to the first bonding layer of the bridging element. The second sheet may comprise an outer barrier layer and an inner bonding layer for bonding to the second bonding layer of the bridging element. In one case the barrier layer of the first and/or second sheet is of a metal or metallised material. The or each barrier layer may be of aluminium foil or of stainless steel foil.

The or each barrier layer may be of metallised polymeric film.

In one embodiment the first and second sheets are of the same material. In some cases the bridging element is of the same material as the first and/or second sheet.

In one embodiment the insulating medium comprises a plurality of insulation pieces and a binder. The insulating medium may comprise an insulating foam material.

The invention provides an insulating panel with compartmentalisation in which a single inner generally rectilinear bridging element may be sealed with controlled spacings to upper and lower sheets. The resulting compartments are filled with insulation material and a vacuum is applied. This provides a rigid panel with a fully sealed circumference.

BRIEF DESCRIPTION OF THE DRAWINGS

The invention will be more clearly understood from the following description of an embodiment thereof, given by way of example only, with reference to the accompanying drawings, in which:

FIG. 1 is an isometric view of a vacuum insulating panel according to the invention;

FIG. 2 is a cross sectional view of the panel of FIG. 1;

FIG. 3 is a cross sectional view of a bridging element of the panel of FIGS. 1 and 2;

FIG. 4 is an isometric view of the element of FIG. 3;

FIG. 6 is a diagram illustrating shaping of the bridging element;

FIG. 7 is an isometric view of a shaped bridging element;

FIGS. 8 and 9 illustrate the insertion of insulating elements into the shaped regions of the bridging element;

FIG. 10 illustrates application of seals to the bridging element;

FIG. 12 is a diagram illustrating the application of the first and the second sheets;

FIG. 13 is an isometric view of a finished vacuum insulating panel;

FIGS. 14 to 17 are views similar to FIGS. 8 to 10 and 12 respectively illustrating steps in an alternative method for manufacturing a vacuum insulating panel;

FIG. 18 is a cross sectional view of another vacuum insulating panel according to the invention;

FIG. 19 is a cross sectional view of a bridging element of the panel of FIG. 8;

FIG. 22 is an enlarged exploded view of another joint detail between adjacent panels of the invention;

FIG. 23 is a view of the assembled joint detail of FIG. 22;

FIG. 31 is a perspective view of a panel with one separation gap along its length with an infill piece;

FIG. 32 is a perspective view of the panel of FIG. 31 with the infill piece in place;

FIG. 34 is a cross sectional view of a panel with a single fixing area; and

FIG. 35 is a cross sectional view of a panel with two fixing areas.

DETAILED DESCRIPTION

Figure 5:
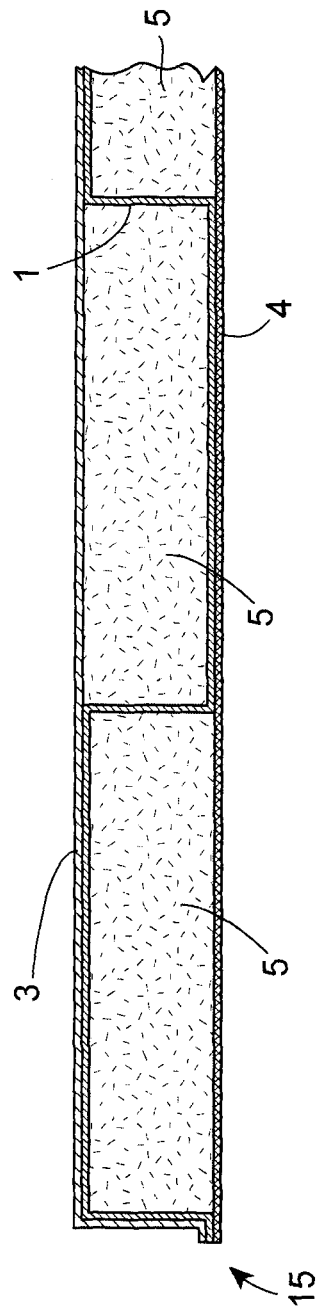
FIG. 5 is a cross sectional view of two like panels.
Figure 11:
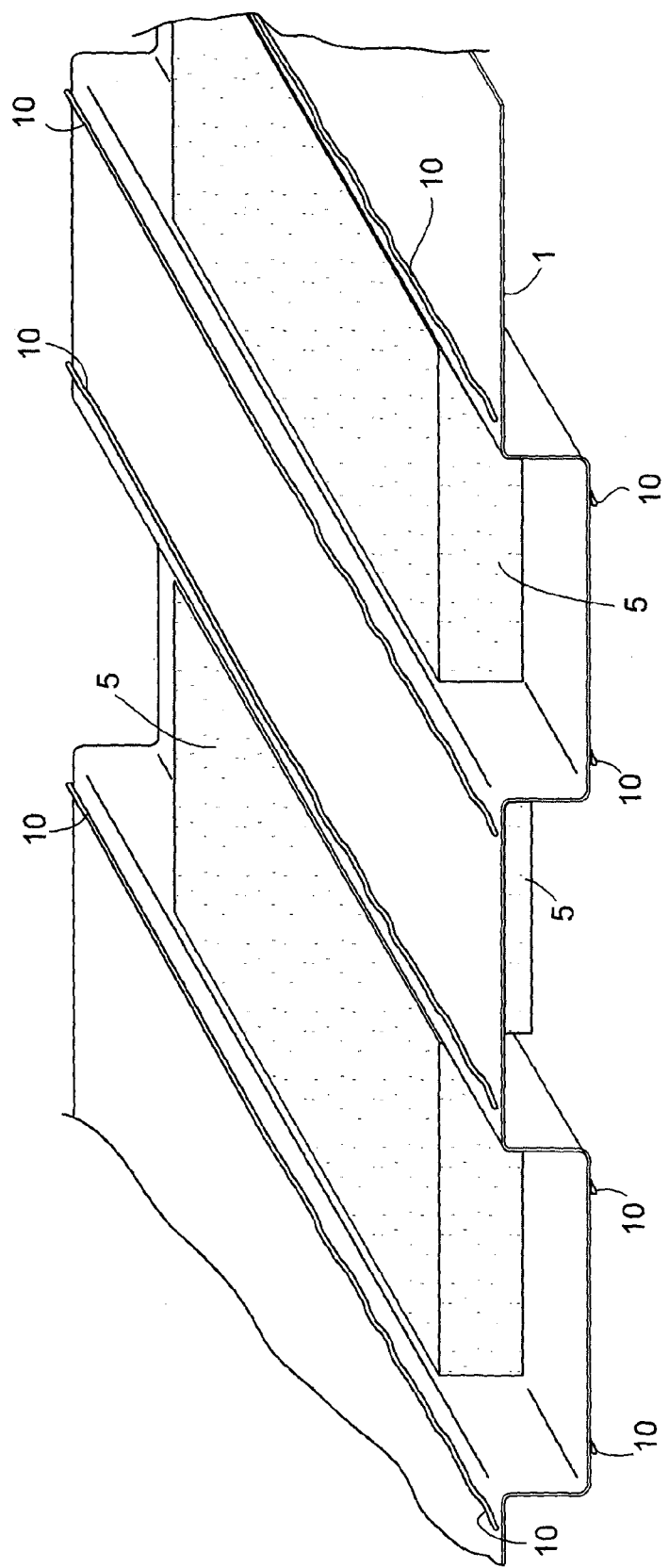
FIG. 11 is an isometric view of a shaped bridging element with insulating elements in place.

The invention provides a compartmentalised vacuum insulation panel which combines one panel part to provide a greater area of vacuumed insulation per square meter, avoiding the poor thermal insulation performance between compartments. The compartmentalisation is segmented with horizontal separation The insulation material in both panel parts is covered top and bottom in a foil/film. This foil/film seals around the compartments and holds the vacuum applied to the insulation materials. The foil/film construction can be made of several layers designed to resist water vapour, oxygen and/or nitrogen transmission, all of which threaten the integrity of the vacuum over time.

The following features of the panels of the invention have the following advantages:

Compartmentalisation reduces the effected puncture damage to a panel

Single inner layer provides for more cost effective panel production

Preformed single inner layer provides for more cost effective panel construction.

Final product is a solid panel similar to existing products

Using Aluminium laminate foil in the inner and outer films allows for long life time (better Moisture vapour transfer rate, Oxygen transfer rate, Nitrogen transfer rate, barrier properties)

Using Pet met laminate as the inner and outer films reduces the edge effects of Aluminium foil Referring to the drawings and initially to FIGS. 1 to 5 thereof there is illustrated a vacuum insulating panel according to the invention which comprises a first or outer sheet 3, a second or inner sheet 4 and a bridging element 1 extending between the sheets 3, 4. In cross section the bridging element 1 has the appearance of a rectilinear wave form and extends from one sheet 2 to the outer sheet 3. The bridging element defines a single divider which provides a compartmentalised panel that can be produced efficiently. The bridging element has attachment regions which are in the form of flattened regions which are used to bond/seal (for example by adhesive bonding or heat sealing) the bridging element 1 to the upper and lower sheets 3, 4.

First flat regions 7 extend along the inside face of the first sheet 2 and second flat regions 8 extend along the inside face of the second sheet 3. Connecting regions extend between the first and second flat regions 7, 8.

Because the bridging element 1 is of generally rectilinear wave form there are enhanced flat regions which facilitate sealing. Sealing is in this case provided at spaced-apart end locations 10 as indicated in FIG. 2. For each compartment there are at least two spaced-apart seals 10 between the bridging element 1 and the sheets 3, 4. This ensures that if one compartment is punctured, for example by a fixing, only that compartment is affected. The seals prevent loss of vacuum in adjacent compartments.

One advantage of a bridging element of rectilinear wave form is that the bridging element can be created without a requirement to pre-form. Such bridging elements can be readily bonded to the outer facings at regular alternate intervals. A straight line wave form provides a straight line connection between each seal between the bridging element 1 and sheets 3, 4

To facilitate sealing the bridging element 1 has a sealing layer on both sides whereas the outer barrier layers 3, 4 may have a sealing layer on the inside only which contact the respective sealing layer of the bridging element. At the ends, for example as indicated at 15 in FIG. 5, all three sheets 1, 3, 4 are sealed together. If the seal was singular, for example at the middle of a compartment it may be possible to loose the vacuum in two compartments with a single puncture. The double seal provided in the vacuum insulation panel of the invention ensures that if there is a puncture it only affects one compartment thereby ensuring that loss of insulation properties are minimised.

The sheets 3, 4 and the bridging element are all of flexible sheet materials and the compartments defined by the sheets 1, 3, 4 are filled with a suitable self supporting insulation material/core element 5. The term self supporting means that the insulation is capable of resisting forces applied under vacuum without collapsing. The compartments are then evacuated. The insulation-filled evacuated compartments are isolated from one another so that if one compartment is punctured there is no adverse impact on the other compartments.

The sheets 1, 3, 4 may be of suitable materials such as metallised polymeric films or foil. The insulation elements may comprise fumed silica, aerogel, and/or a suitable foam material such as a phenolic or polyisocyanurate foam.

The bridging element 1 substantially reduces heat conduction (thermal bridging) across the panel comprising interweaved compartments.

In some cases the bridging element 1 may be pre-formed to a desired shape. For example, the bridging element may be of a single layer such as a polymeric material such as a polyethylene film material. Such a film would typically have a thickness of about 0.2 mm.

Referring to FIGS. 6 to 13 there is illustrated a method for manufacturing a vacuum insulation panel on a large factory scale. The vacuum insulation panel is in this case of the type illustrated in FIGS. 1 to 5 and like parts are assigned the same reference numerals. The bridging element may be supplied in the form of a flexible sheet 75 which is formed into the desired rectilinear wave form for example by using forming elements 70. Insulating material in the form of blocks 5 are inserted as illustrated and lines of sealant 10 are applied using applicator heads 77. The outer sheets 3, 4 are then applied over the bridging element and the insulating elements 5 and are sealed to the bridging element 1 by the sealant/adhesive 10. When completed, a vacuum is applied to evacuate the compartments and thereby draw the various sheets together, and the ends are sealed.

An alternative method of manufacture is illustrated in FIGS. 14 to 17 which are similar to FIGS. 8 to 10 and 12 respectively. In this case an insulating element 5 is inserted into an individual compartment, the seals 10 are applied adjacent to this compartment and the sheets 3, 4 are applied. A second insulating element is inserted into the adjacent compartments and the sheets 3, 4 applied to the seals 10 adjacent to that compartment. The process is repeated.

Both methods provide efficient large seal production of vacuum insulation panels with reduced effect of puncture damage.

Referring to FIGS. 18 and 19 there is illustrated another vacuum insulating panel according to the invention. In this case a bridging element 50 comprises a plurality of layers. There is a barrier layer 51 which is typically of a metal or metallised material. There is a first bonding layer 52 on one face of the barrier layer 5 and a second bonding layer 53 on an opposite face of the barrier layer 51.

The first sheet in this case comprises an outer barrier layer 55 and an inner bonding layer 56 for bonding to the first bonding layer 52 of the bridging element 50. Similarly, the second sheet in this case comprises an outer barrier layer 58 and an inner bonding layer 59 for bonding to the second bonding layer 53 of the bridging element 50.

One advantage of this embodiment is that the vacuum insulation chambers have added protection on either side of a puncture to prevent loss of vacuum over time. The barrier layer 51 of the bridging element is typically of a metallised polymer material such as metallised polyester. The bonding layers 52, 53 may be of a polyethylene such as low density polyethylene film. The bonding layers 52, 53 of the bridging element 50 are compatible with the bonding layers 56, 59 of the associated first and second sheets of the vacuum insulating panel. The bonding may be achieved using an adhesive and/or by heat sealing.

Using a metallised polymeric material as the barrier layer of the bridging element instead of a single metal foil greatly reduces thermal bridging across the panel. In the case of a single layer bridging element use of a polymeric film such as low density polyethylene also greatly reduces thermal bridging.

Figure 20:
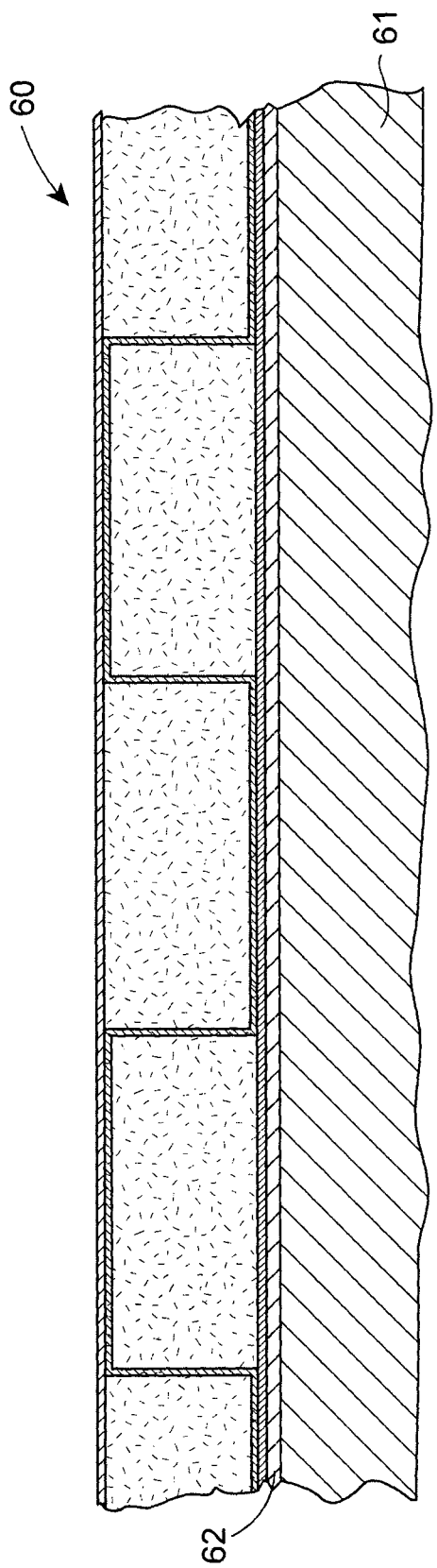
FIG. 20 is a cross sectional view illustrating the mounting of a vacuum insulating panel to a building substrate.

Referring to FIG. 20 the fixing of a vacuum insulated panel 60 according to the invention to an underlying building substrate 61 is illustrated. In this case the fixing is achieved using a bonding layer 62 between the outer face of the inner sheet of the panel and the building substrate 61. One advantage of such a fixing method is that puncturing of a vacuum insulating compartment of the panel is avoided.

Figure 21:
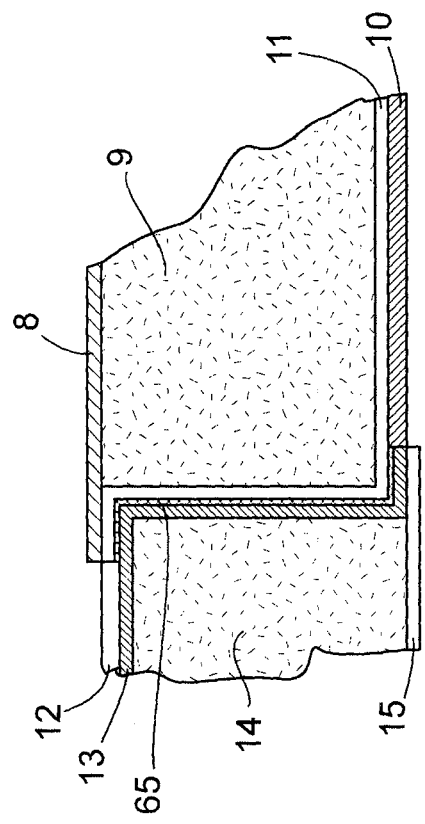
FIG. 21 is an enlarged view of a joint detail between adjacent panels of the invention.

Referring to FIG. 21 there is illustrated a joint between two adjacent panels of the invention. In this case there is an additional bonding layer 65 at the joint to substantially prevent air flow at a joint between panels. The bridging layer 11 may be coated on both sides with adhesive whilst the layers 8, 10 only require an inner adhesive layer. Alternatively or additionally a jointing tape may be applied over the inner and/or outer sheets at the joint.

Referring to FIGS. 22 and 23, in the case of a bridging element which is not metallised, the outer foils are extended to form extensions 40, 41 to cover the butting ends of adjacent panels to enhance barrier properties at the joint. Such non-metallised bridging elements 1 may be preformed to a desired shape. A sealant or tape 45 may be applied over the joint.

Figure 24:
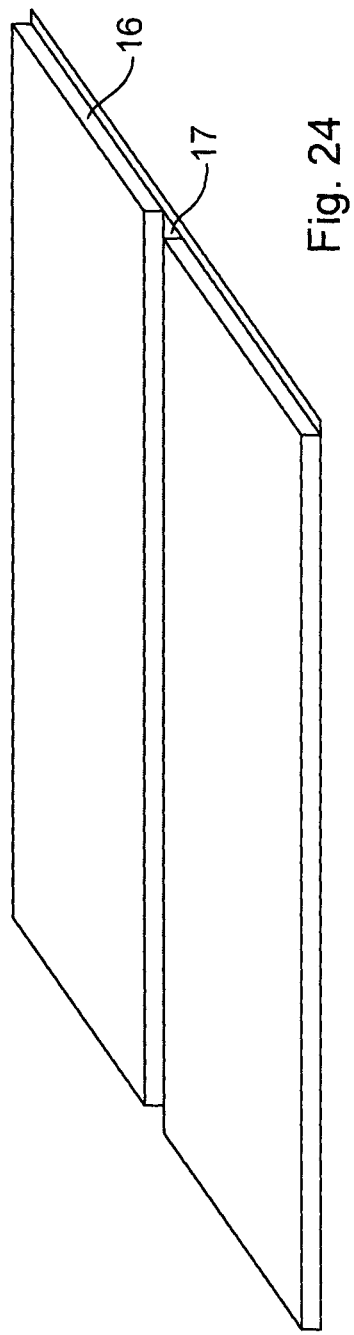
FIG. 24 is a perspective view of a panel according to the invention having one separation gap along its length.
Figure 25:
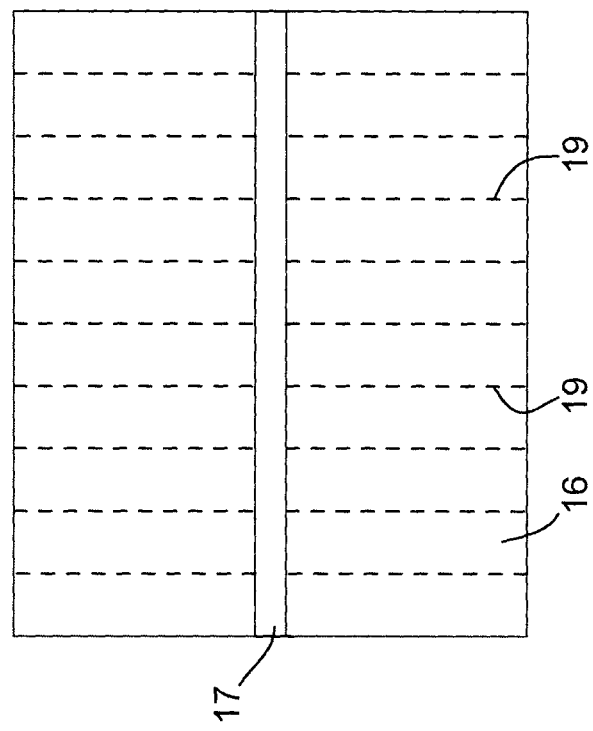
FIG. 25 is a top view of the panel of FIG. 24.
Figure 26:
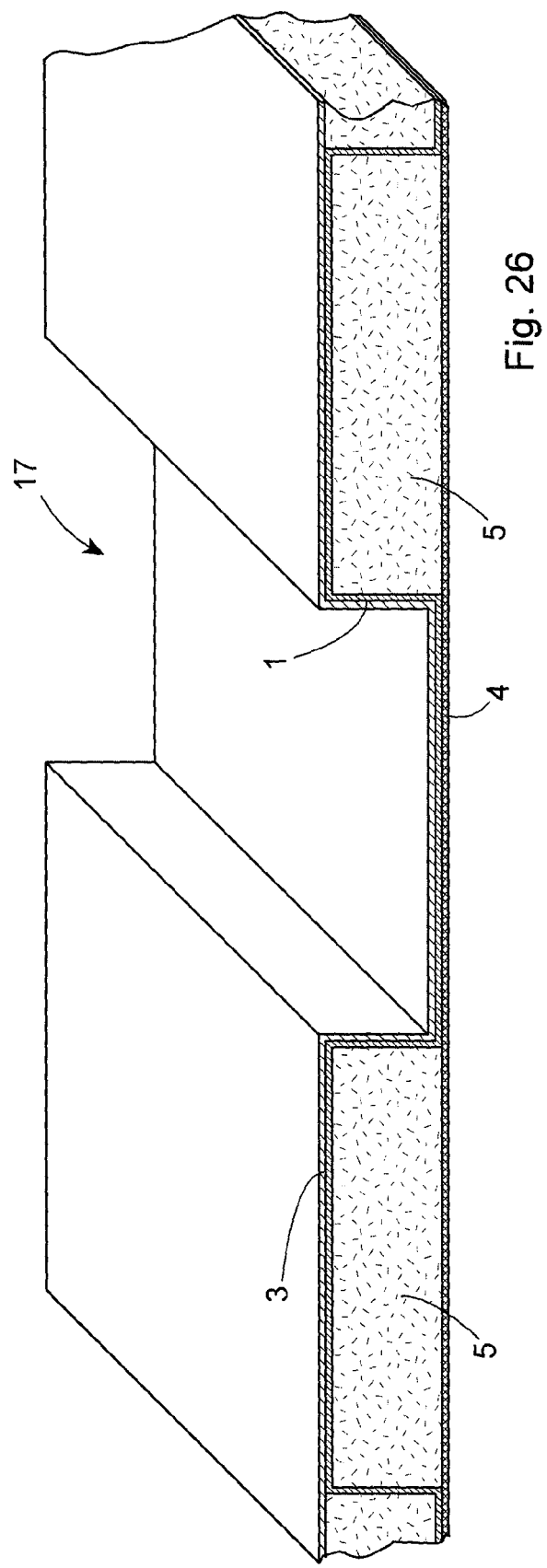
FIG. 26 is a cross sectional view of portion of the panel of FIGS. 24 and 25.

Referring to FIGS. 24 and 25 there is illustrated a panel 16 according to the invention which has a single gap 17 extending longitudinally along the length of the panel. This gap facilitates fixing of the panels, in use, for example to an underlying support structure. The separate compartments containing insulation material are indicated by interrupted lines 19. The bridging elements 1 defining the separate compartments are illustrated in FIG. 26.

Figure 27:
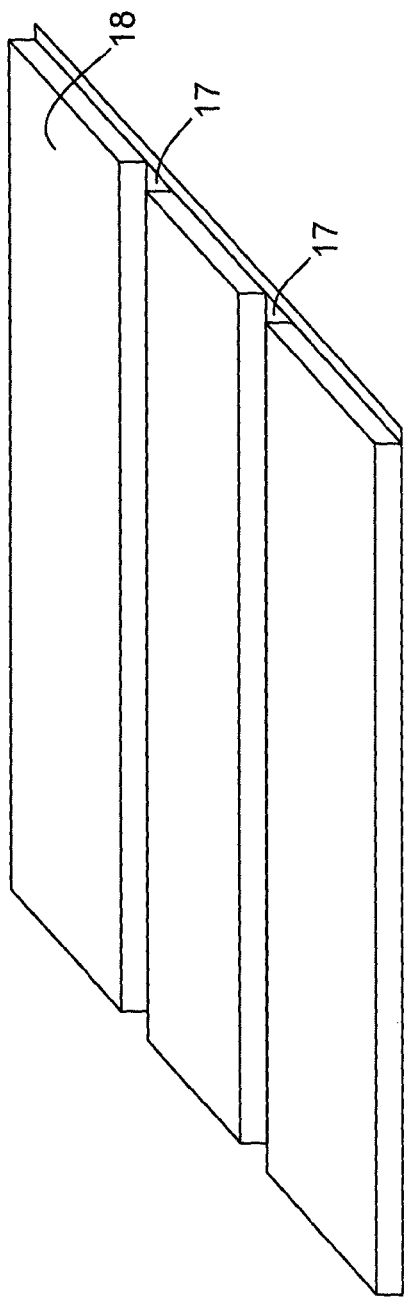
FIG. 27 is a perspective view of another panel according to the invention having two separation gaps along its length.
Figure 28:
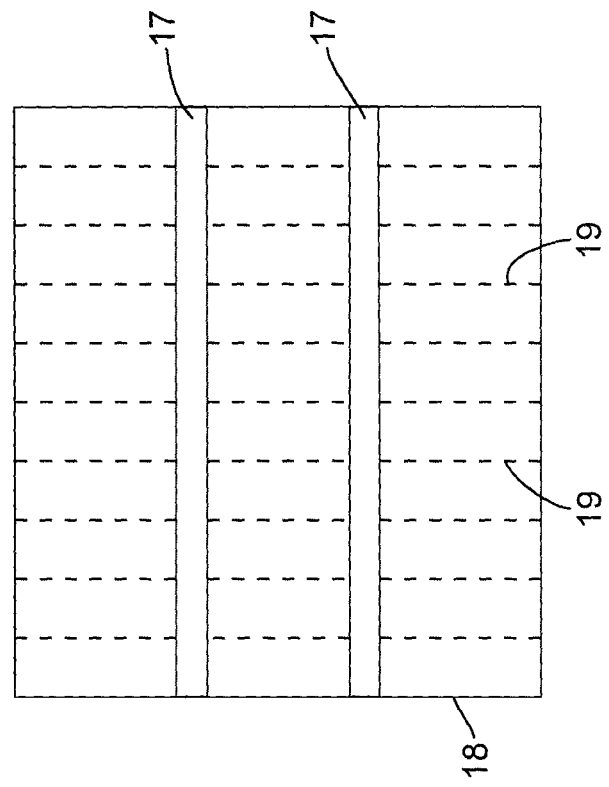
FIG. 28 is a top view of the panel of FIG. 27.

There may be any desired number and/or arrangement of such fixing gaps. For example FIGS. 27 and 28 illustrate a panel 18 with two such gaps 17. The compartments are again indicated by interrupted lines 19.

Figure 29:
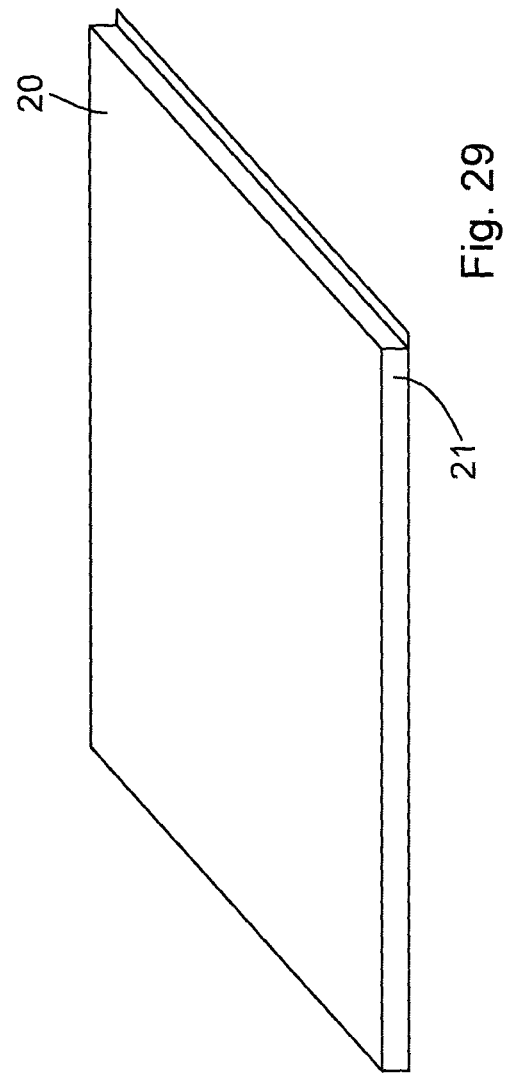
FIG. 29 is an isometric view of another panel according to the invention.

In another arrangement illustrated in FIG. 29 a panel 20 does not have any separation gaps (i.e. a monoblock) and the foil facings 21 are wrapped around the panel edges to seal the panel.

Figure 30:
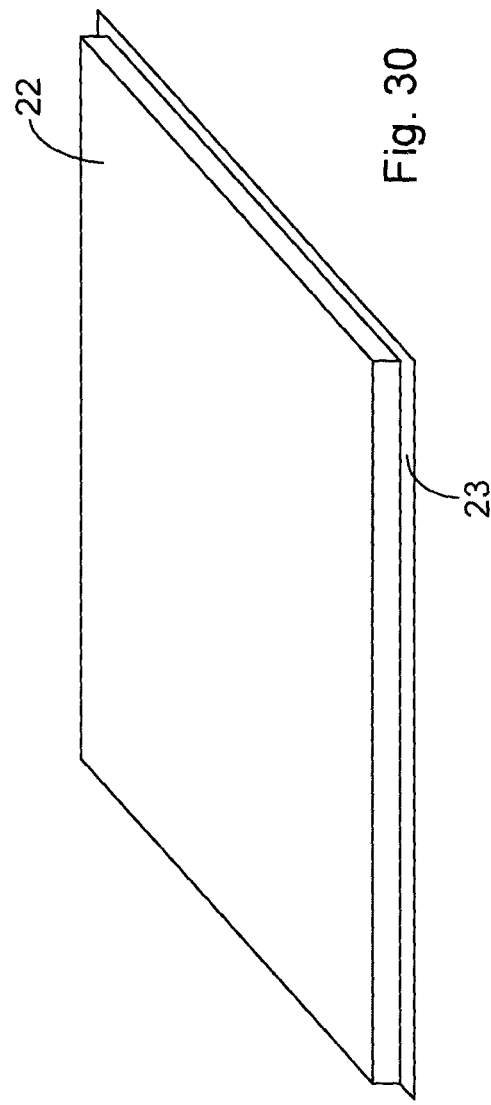
FIG. 30 is a view of the panel of FIG. 29 with one facing peeled back.

Referring to FIG. 30 another monoblock panel 22 is illustrated. In this case the facings have overlapping or flange portions 23 which are used to complete the finished panels.

Figure 33:
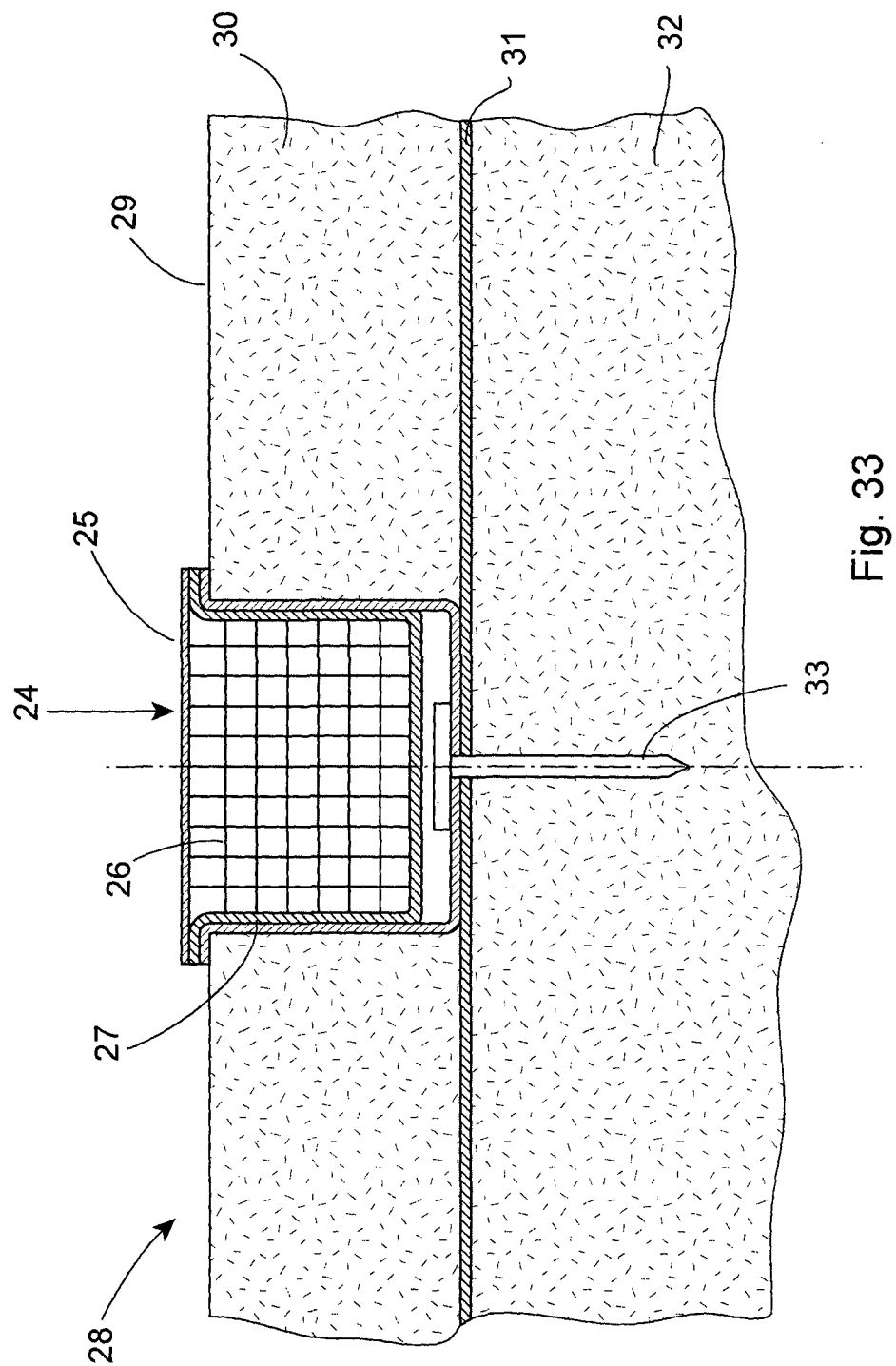
FIG. 33 is a cross section of the panel with the infill piece in place.

Referring to FIGS. 31 to 33 there is illustrated a panel 16 with a separation gap 17 along its length with an infill piece 24 which is fitted in the direction of the arrows. The infill 24 can be a vacuum insulated panel or other insulation material and is designed to complete the panel once fixed into position. The infill can be glued in place FIG. 33 illustrates the infill piece 24 in place. The infill piece is in this case a vacuum insulating panel having a top facing 25, bottom facing 27 and insulation material core 26. The infill piece 24 fits inside the main panel 28. The main VIP section shows the top laminate facing 29, bottom laminate facing 31 and insulation material core 30 of a main panel 28. The panel 28 is fixed to the building substrate 32 by a fixing 33. The fixing 33 is then covered by the infill piece 24.

FIG. 34 illustrates a wide single area of seal between dotted lines 34 which can be pierced for fixing to a building substrate. FIG. 35 shows a double seal where each seal width is shown by dotted lines 35 and is thinner than the arrangement of FIG. 34 but further apart giving a wider area for a fixing to go through.

Modifications and additions can be made to the embodiments of the invention described herein without departing from the scope of the invention. For example, while the embodiments described herein refer to particular features, the invention includes embodiments having different combinations of features. The invention also includes embodiments that do not include all of the specific features described.

The invention is not limited to the embodiments hereinbefore described, with reference to the accompanying drawings, which may be varied in construction and detail.

The invention claimed is:

1. A vacuum insulating panel comprising:
   a first sheet of a flexible material,
   a second sheet of a flexible material, a bridging element of a flexible material extending in a generally rectilinear waveform between the first and the second sheet,
   the bridging element and the sheets defining therebetween a plurality of separate generally rectilinear evacuated compartments containing a self-supporting insulating element,
   the bridging element comprising first flat regions extending along the inside face of the first sheet, second flat regions extending along the inside face of the second sheet, and connecting regions extending between the first and second flat regions, and for each compartment, seals between the flat regions of the bridging element and the inside face of the respective first or second sheet, wherein for each compartment there are at least two spaced apart seals between the bridging element and the respective first or second sheet.

2. The vacuum insulating panel as claimed in claim 1 wherein a seal is located adjacent to each corner of the bridging element in contact with the sheet.

3. The vacuum insulating panel as claimed in claim 1 wherein the panel comprises at least two panel parts which are separated by a fixing gap.

4. The vacuum insulating panel as claimed in claim 3 wherein the gap extends longitudinally along the length of the panel.

5. The vacuum insulating panel as claimed in claim 3 wherein the vacuum insulating panel comprises a filler for filling the gap.

6. The vacuum insulating panel as claimed in claim 3 wherein the vacuum insulating panel comprises at least two spaced apart fixing gaps.

7. The vacuum insulating panel as claimed in claim 1 wherein the bridging element is pre-formed to a shape.

8. The vacuum insulating panel as claimed in claim 7 wherein the bridging element is of a polyethylene film.

9. The vacuum insulating panel as claimed in claim 1 wherein the bridging element comprises a single layer.

10. The vacuum insulating panel as claimed in claim 1 wherein the bridging element comprises a plurality of layers.

11. The vacuum insulating panel as claimed in claim 10 wherein the bridging element comprises a barrier layer, a first bonding layer on one face of the barrier layer for bonding to the first sheet, and a second bonding layer on an opposite face of the barrier layer for bonding to the second sheet.

12. The vacuum insulating panel as claimed in claim 11 wherein the barrier layer of the bridging element comprises a metal or metallised material.

13. The vacuum insulating panel as claimed in claim 11 wherein the first outer sheet comprises an outer barrier layer and an inner bonding layer for bonding to the first bonding layer of the bridging element.

14. The vacuum insulating panel as claimed in claim 11 wherein the second sheet comprises an outer barrier layer and an inner bonding layer for bonding to the second bonding layer of the bridging element.

15. The vacuum insulating panel as claimed in claim 13 wherein the barrier layer of the first and/or second sheet is of a metal or metallised material.

16. The vacuum insulating panel as claimed in claim 11 wherein the or each barrier layer is of aluminum foil.

17. The vacuum insulating panel as claimed in claim 11 wherein the or each barrier layer is of stainless steel foil.

18. The vacuum insulating panel as claimed in claim 11 wherein the barrier layer is of metallised polymeric film.

19. The vacuum insulating panel as claimed in claim 1 wherein the first and second sheets are of the same material.

20. The vacuum insulating panel as claimed in claim 1 wherein the bridging element is of the same material as the first and/or second sheet.

21. The vacuum insulating panel as claimed in claim 1 wherein the insulating element comprises a plurality of insulation pieces and a binder.

22. The vacuum insulating panel as claimed in claim 1 wherein the insulating element comprises an insulating foam material.

23. A vacuum insulating panel comprising:
   a first sheet of a flexible material,
   a second sheet of a flexible material, a bridging element of a flexible material extending in a generally rectilinear waveform between the first and the second sheet,
   the bridging element and the sheets defining therebetween a plurality of separate generally rectilinear evacuated compartments containing a self-supporting insulating element,
   the bridging element comprising first flat regions extending along the inside face of the first sheet, second flat regions extending along the inside face of the second sheet, and connecting regions extending between the first and second flat regions, and for each compartment, seals between the flat regions of the bridging element and the inside face of the respective first sheet and the second sheet wherein for each compartment there are at least two spaced apart seals between the bridging element and the respective first sheet and second sheet.

* * * * *